(12) United States Patent
Bennett et al.

(10) Patent No.: US 6,907,510 B2
(45) Date of Patent: Jun. 14, 2005

(54) MAPPING OF INTERCONNECT CONFIGURATION SPACE

(75) Inventors: Joseph A. Bennett, Roseville, CA (US); Randolph L. Campbell, Sacramento, CA (US); Prashant Sethi, Folsom, CA (US); Jose Vargas, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 10/114,661

(22) Filed: Apr. 1, 2002

(65) Prior Publication Data

US 2003/0188122 A1 Oct. 2, 2003

(51) Int. Cl.[7] ............................................... G06F 12/10
(52) U.S. Cl. ...................... 711/202; 711/209; 710/10; 710/9
(58) Field of Search ............................ 710/2–4, 8–10, 710/104, 306, 314; 711/2, 202, 203, 209

(56) References Cited

U.S. PATENT DOCUMENTS

| | | | | |
|---|---|---|---|---|
| 5,542,055 A | * | 7/1996 | Amini et al. | 710/306 |
| 5,761,448 A | * | 6/1998 | Adamson et al. | 710/104 |
| 5,857,083 A | * | 1/1999 | Venkat | 710/314 |
| 5,960,213 A | * | 9/1999 | Wilson | 710/2 |
| 5,991,856 A | * | 11/1999 | Spilo et al. | 711/147 |

OTHER PUBLICATIONS

Microsoft, Microsoft Computer Dictionary, 2002, Fifth Edition, p. 386.*
*PCI Express Base Specification*, Rev. 1.0, Chapter 5, pp. 215–291, available from http://www.pcisig.com/specifications.

Lawyer, David S., "Plug–And–Play–HOWTO," Printed on or about Oct. 12, 2001 from http://www.tldp.org/HOWTO/Plug-and-Play-HOWTO.html, Publication date unknown.

"Third–Generation I/O (3GIO) Information," Printed on Oct. 12, 2001 from http://www.pcisg.com, Publication date unknown.

"Intel® 440BX AGPset Product overview," Printed on Oct. 12, 2001, from http://www.intel.com/design/chipsets/440bx/index.htm, Publication date unknown.

"PCI Local Bus Specification, Revision 2.3, Mar. 29, 2002," PCI Special Interest Group, Portland, Oregon, 282 pages.

* cited by examiner

*Primary Examiner*—Gary Portka
(74) *Attorney, Agent, or Firm*—Fish & Richardson P.C.

(57) ABSTRACT

A method for accessing a configuration data space for a device connected to a processor through an interconnect includes receiving a request from the processor to access the processor's addressable space. The request is generated in response to receiving an instruction intended to access the device's configuration data space. A map between the device's configuration data space and the processor's addressable space is accessed, the map having previously mapped the device's configuration data space to one or more pages of the processor's addressable space. Using the map, the request from the processor is translated into a configuration cycle on the interconnect to access the device's configuration data space.

24 Claims, 11 Drawing Sheets

MAPPING OF INTERCONNECT CONFIGURATION SPACE

CROSS-REFERENCE TO RELATED APPLICATIONS

This application is related to U.S. application Ser. No. 10/114,427, entitled "Device Virtualization and Assignment of Interconnect Devices," being filed concurrently herewith.

TECHNICAL FIELD

This invention relates to the field of computer interconnects, and more particularly to accessing devices over an interconnect.

BACKGROUND

Standard computer interconnects, particularly for personal computers or workstations, may employ a bus such as Peripheral Component Interconnect ("PCI"), Industry Standard Architecture ("ISA"), or Extended ISA ("EISA"). In such interconnects, it is common to attach devices to the bus in a parallel or multi-drop fashion. Before these devices can be made available for a variety of applications, the devices must be detected and configured. These processes are generally performed during a computer's start-up routines. Additionally, in plug-and-play systems, the detection and configuration can occur automatically when a device is connected to the bus after the computer has performed its start-up.

DESCRIPTION OF DRAWINGS

Like reference symbols in the various drawings indicate like elements.

DETAILED DESCRIPTION

Techniques are provided for accessing a configuration data space for a device connected to a processor through an interconnect. A request is received to access the processor's addressable space, the request being generated by the processor in response to receiving an instruction intended to access the device's configuration data space. A map between the device's configuration data space and the processor's addressable space is accessed, the map having previously mapped the device's configuration data space to one or more pages of the processor's addressable space. Using the map, the request from the processor is translated into a configuration cycle on the interconnect to access the device's configuration data space.

The described techniques may allow devices on a bus or on a point-to-point interconnect to be accessed without resort to the use of input-output instructions. The described techniques also may allow the use of atomic operations to access device configuration data. Multiple virtual machines ("VMs") may run on a computer, and a device may be assigned uniquely to a particular VM. A VM may be inhibited from accessing a device that is not assigned to that VM.

Using Memory Space for Configuration Data

Figure 1:
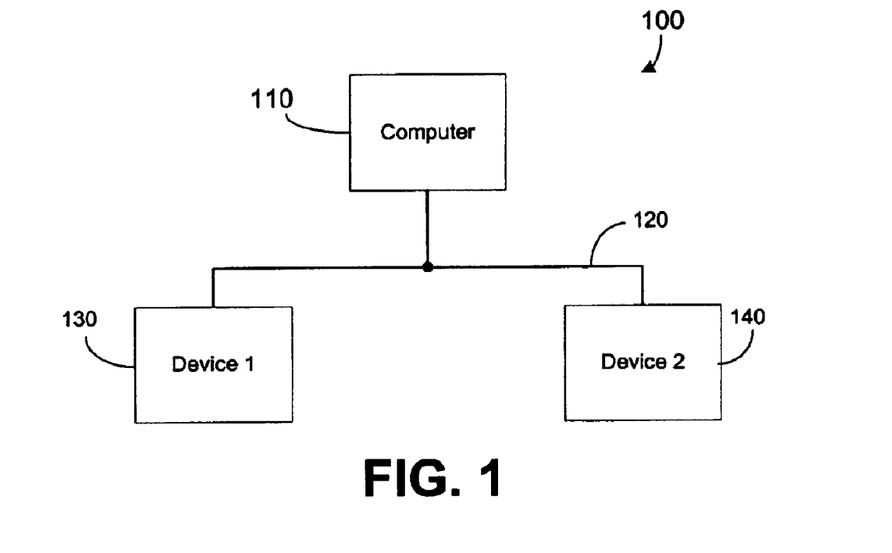
FIG. 1 is a block diagram of a computer system including a multi-drop interconnect.
Figure 2:
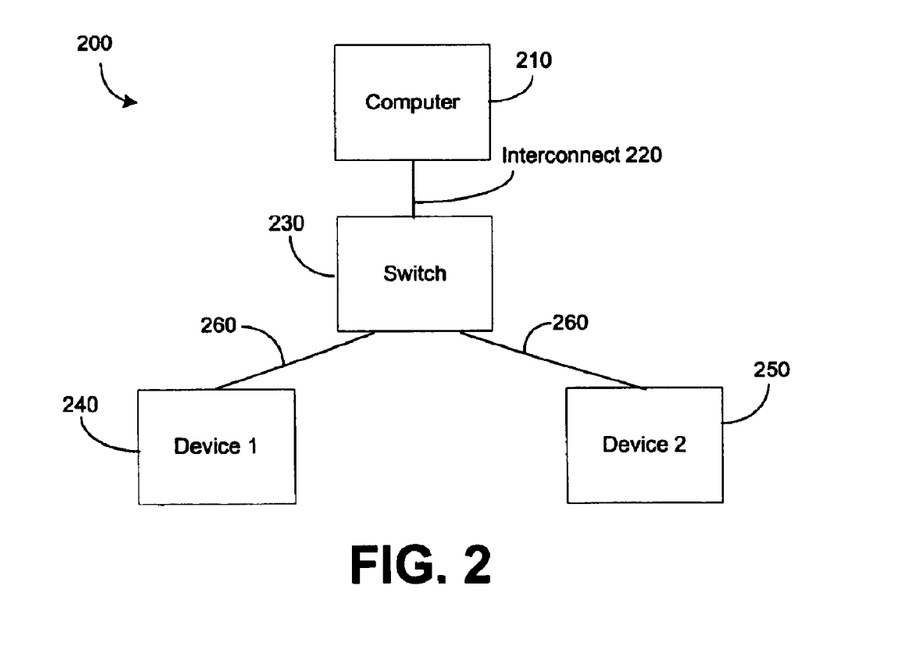
FIG. 2 is a block diagram of a computer system including a point-to-point interconnect.

Systems may be configured to access devices on a bus or on a point-to-point interconnect efficiently and to allow data to be addressed on each device. As one example, configuration data on a device that is connected to an interconnect may be accessed. The term interconnect refers to a bus and its standard, and includes, among others, both traditional parallel buses and point-to-point or fan-out connections. FIGS. 1 and 2 illustrate computer systems 100, 200 that include, respectively, a parallel or multi-drop bus and a point-to-point or fan-out connection. In particular, system 100 of FIG. 1 includes a computer 110 connected over an interconnect 120, in parallel fashion, to a first device 130 and to a second device 140. Similarly, system 200 of FIG. 2 includes a computer 210 connected over an interconnect 220 to a switch 230, which is then connected in a point-to-point fashion to a first device 240 and a second device 250 over an interconnect 260. For definitional purposes, in FIG. 2, computer 210 is said to be connected directly to switch 230 and connected indirectly to the first device 240.

Figure 3:
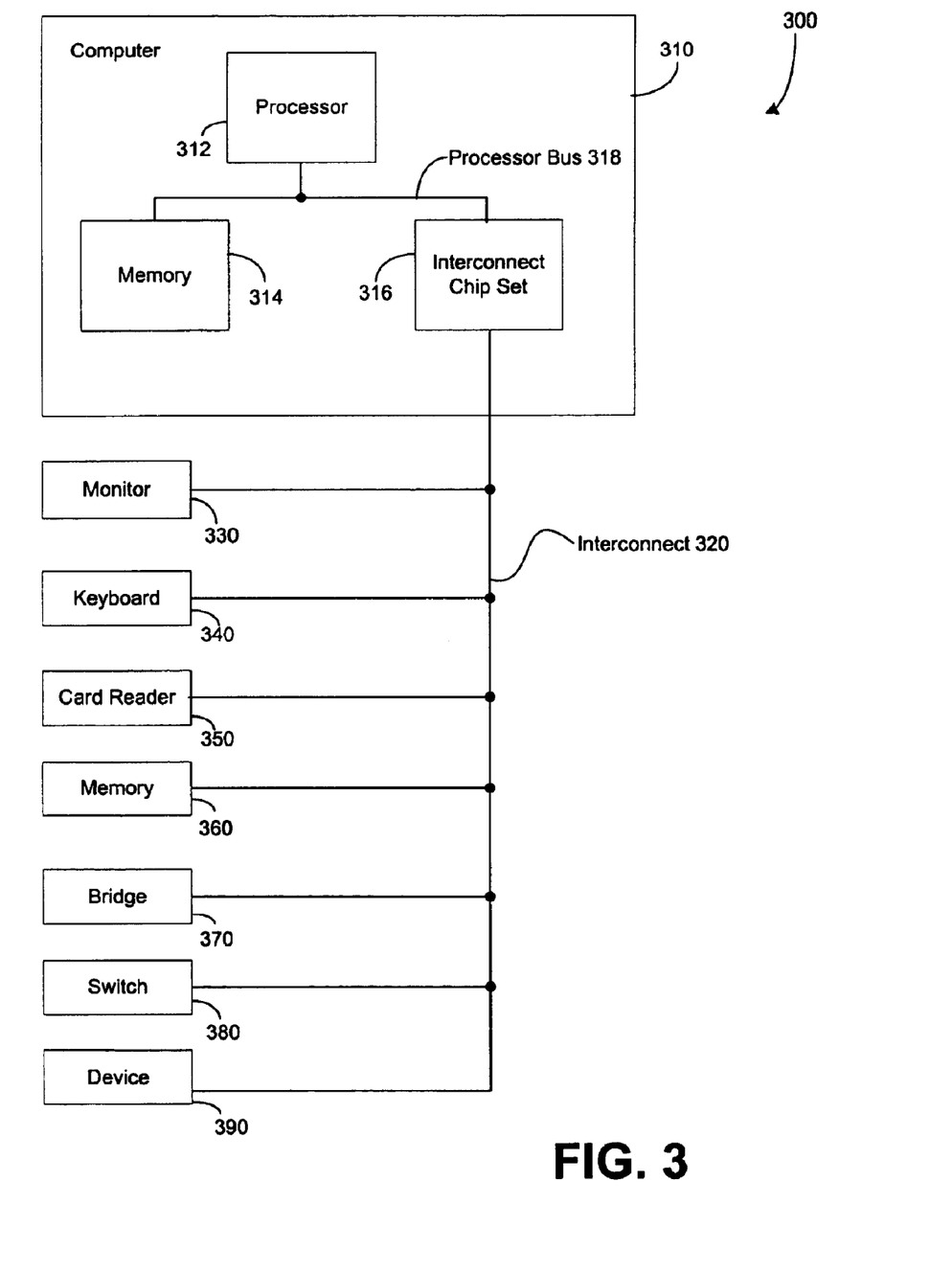
FIG. 3 is a block diagram of a computer system.

As shown in FIG. 3, a system 300 includes a computer 310 that includes a processor 312, memory 314, an interconnect chip set 316, and a processor bus 318 that connects these elements together. The interconnect chip set 316, which also may be referred to as "glue logic" or a "controller," connects the computer to the interconnect and the attached devices. The chip set typically provides a mechanism for configuring the devices by, for example, assigning addresses and interrupt-request lines. Interconnect 320 connects computer 310, through interconnect chip set 316, to a monitor 330, a keyboard 340, a card reader 350, memory 360, a bridge 370 (providing access to another interconnect), a switch 380, and a device 390, which is a generic device representing the variety of input-output devices and other components that may be connected to interconnect 320. It is to be understood that the system of FIG. 3 is only an implementation and a variety of other configurations are possible. Again for definitional purposes, in FIG. 3, processor 312 is said to be connected directly to memory 314 and connected indirectly to monitor 330.

The operation of the system 300 of FIG. 3 may be better understood in contrast to operation of an implementation of a standard PCI system. FIG. 3, as mentioned earlier, relates particularly to accessing configuration data on a device. Such access is typically used either to detect a device or to configure a device, both of which are typically performed before the device is used. Depending on the purpose, a configuration data access may be a read, a write, a mask, or some other operation.

The PCI standard provides for multiple address spaces. One of these is a configuration address space, also referred to as a configuration space, in which the configuration data of attached devices are addressed by the interconnect. The configuration address space is distinct from the processor's address spaces. PCI chip sets, such as Intel's 440BX, map the PCI configuration space into the processor's input-output ("I/O") address space, also referred to as I/O space. Thus, to access configuration data on an attached device, a processor executes an I/O instruction. This involves performing a two-step operation of, first, selecting an address and, second, operating on that address with, for example, a read operation. Two-step operations may be less efficient than one-step, or atomic, operations.

The mapping from the processor's I/O space to the PCI configuration space is typically performed by the PCI chip set. After the processor receives an I/O instruction requesting access to device configuration data, the processor passes the request along by producing an appropriate bus access cycle on the processor's bus. The PCI chip set then translates the processor's bus access cycle, that is, the processor's request, into a configuration cycle on the interconnect.

Figure 4:
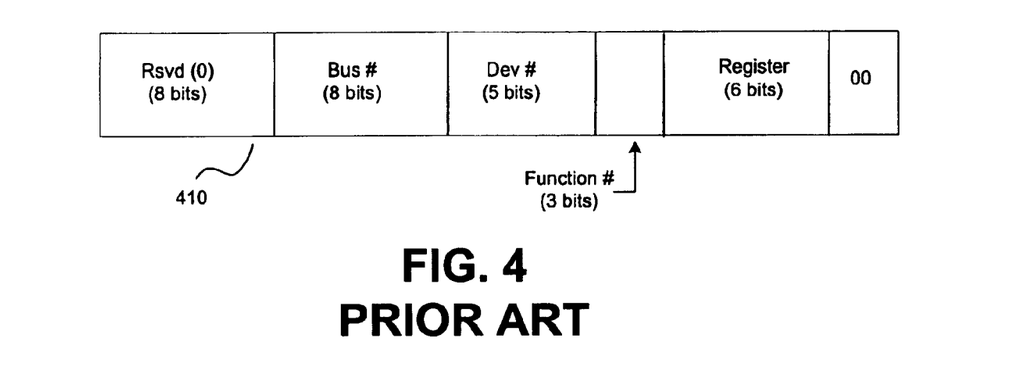
FIG. 4 is a block diagram of a format for an input-output register in a PCI chip set.

Referring to FIG. 4, the PCI chip set uses I/O register 410 to access configuration data on a device. The I/O register 410 on the PCI chip set can create a bottleneck because all device configuration data accesses must go through this register 410. Thus, use of the I/O register 410 on the PCI chip set must be synchronized.

I/O register 410 also imposes additional design limitations on a PCI system. As shown in FIG. 4, the left-most eight bits are reserved. The next sixteen bits are used to identify the device. The right-most eight bits are used to identify the location on the device, thus allowing each device to have up to 256 bytes of configuration data. Because the right-most two bits are fixed at zero, the device configuration data are generally only addressable in four-byte increments. In common processors, the addressable I/O space is limited to 64 kilobytes, or 16 bit addresses. Given that each device is allocated 256 bytes of configuration data address space, eight bits are needed to address the data. If an atomic operation, instead of a two-step operation, were used to access configuration data mapped to such an I/O space, there would only be eight bits remaining, allowing a maximum of 256 devices.

Figure 5:
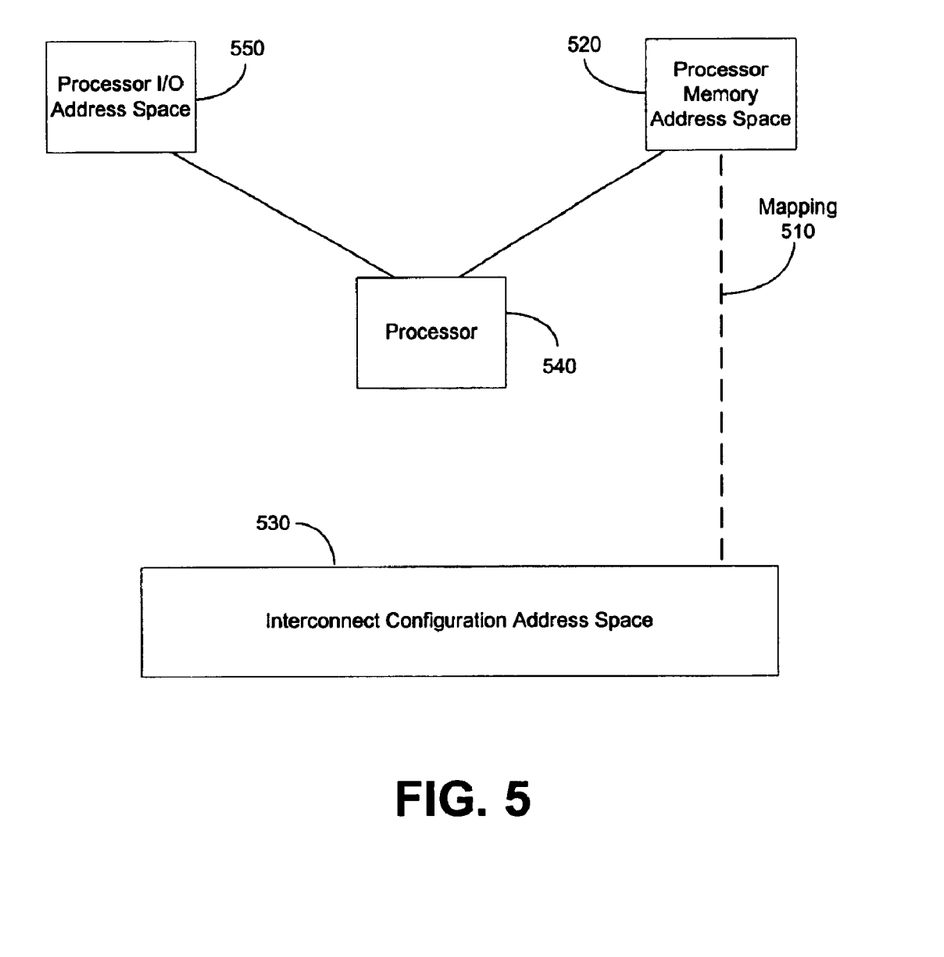
FIG. 5 is a block diagram showing a mapping between address spaces.

In contrast, the system of FIG. 3 maps the interconnect's device configuration space to the processor's memory address space, also referred to as memory space. This is depicted in FIG. 5 as a mapping 510 between processor memory address space 520, of a processor 540 that also has I/O address space 550, and interconnect configuration address space 530. Thus, in the implementation of FIG. 3, the processor 312 would access the configuration data of the attached devices 330-390 using the processor's memory space. As a result, the implementation uses the processor's existing memory instructions, instead of the processor's I/O instructions, to access device configuration data. Memory instructions are generally one-step, or atomic, operations that operate on an address without a separate step of selecting that address. The term atomic connotes indivisibility and is often used in computing to describe an operation which must be carried to completion or not performed at all. As a result of their simplified execution, memory instructions are generally more efficient than I/O instructions.

Figure 6:
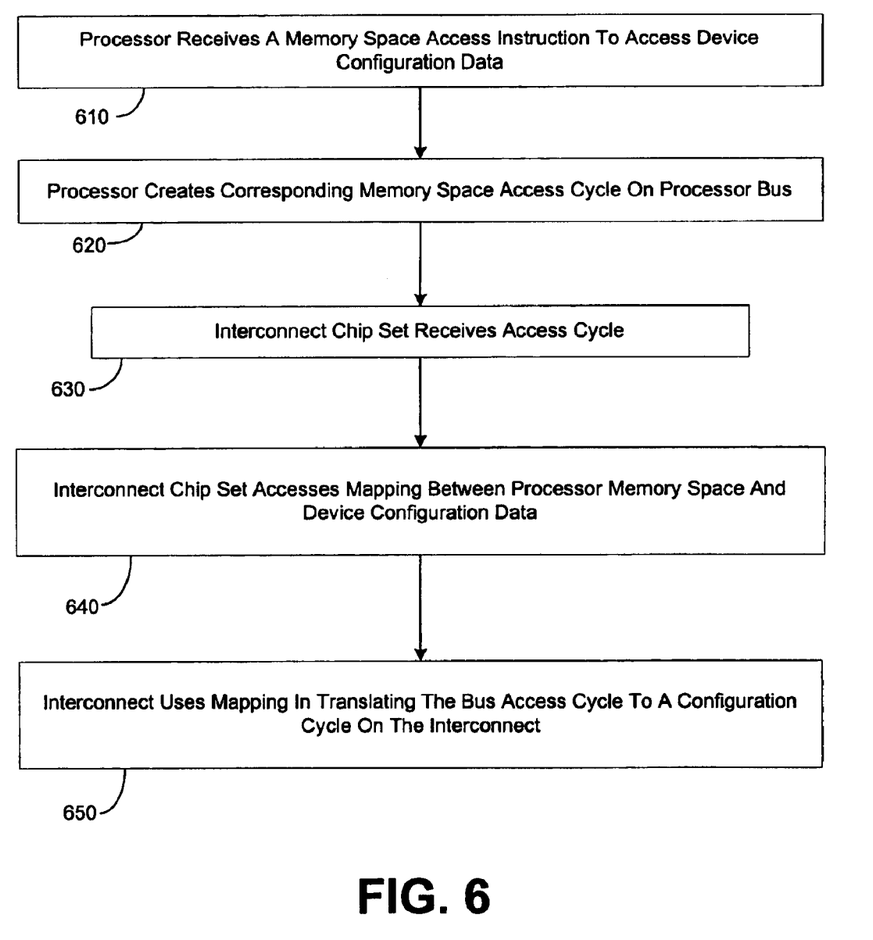
FIG. 6 is a flow chart of a process for accessing device configuration data.

The implementation of FIG. 3 requires that the interconnect chip set respond to processor memory space access cycles on the processor's bus if those access cycles are directed to addresses mapped to device configuration data. FIG. 6 depicts a process for accessing device configuration data.

The processor first receives a memory space access instruction to access device configuration data (610). The processor then creates a corresponding memory space access cycle on the processor bus (620). Both the instruction and the access cycle can be referred to as requests to access device configuration data. The interconnect chip set receives the access cycle (630). The interconnect chip set then accesses a mapping between the processor's memory address space and the device's configuration data (640).

The mapping may have been performed by the chip set or by another entity, such as, for example, a host monitor or other software. In particular implementations, including plug-and-play systems that automatically detect devices, a host monitor may be tasked with performing the mapping or with directing a chip set to perform the mapping. The mapping is often stored on the interconnect chip set itself, but need not be.

Accessing the mapping is intended to provide the interconnect chip set with the address of the device configuration data on the interconnect. In alternate implementations, accessing the mapping may be completed with, for example, a table look-up, calculation of an equation, receiving the information from another source, having the mapping information automatically passed to the interconnect, previously storing the information, or maintaining the mapping information in an active register. "Access" in this context is intended to be broad and occurs when the interconnect chip set has the necessary information to address the device configuration data.

Finally, the interconnect chip set uses the mapping information to translate the memory space bus access cycle to a configuration cycle on the interconnect, with the goal of accessing the configuration data of the device (650).

The chip set need not, in this implementation, use an I/O register as in the PCI system. Accordingly, the bottleneck from the I/O register is removed, as is the need for synchronizing access to this register. This implementation is therefore more robust than the standard PCI implementation. It is also important to note that the interconnect need not be a PCI.

Further, the restriction imposed by the 64 kilobyte limit on processor I/O space (assuming an atomic operation would be created and used to access that space) is removed, as are the restrictions imposed by the format of the I/O register. Thus, there is no longer necessarily a limit to 256 devices or to 256 configuration bytes per device. Indeed, there is no necessary constraint on the number of devices or the amount of configuration data, other than the size of the memory space. Because the addressable memory space for a processor is typically four gigabytes, using 32 bit addresses, there is considerable flexibility. One implementation provides addressing of up to four kilobytes (12 bit addresses) of configuration data for each device, allowing 20 bits of addressing for addressing devices in a standard system.

In summary, at least four beneficial effects can typically be expected. First, the implementation may improve efficiency because the processor now executes atomic memory instructions, instead of I/O instructions, to access device configuration data. Second, efficiency may be improved because the bottleneck created by the I/O register is removed. Third, more devices can generally be addressed. Fourth, each device can generally have more configuration data.

This implementation can also be backward compatible with PCI systems and typically still retain many of these benefits. For backward compatibility, the interconnect chip set translates the device configuration bus access cycles to PCI configuration cycles. The interconnect chip set also needs to employ the format shown in FIG. 4 for addressing PCI devices. Such an implementation still eliminates the I/O register and allows memory instructions from the processor. Thus, the efficiency benefits are retained. Further, the restriction imposed by the 64 kilobyte (16 bit address) limit on I/O addressing is also removed. Thus, the full 24 bits available in the PCI format, as indicated in the format of the I/O register 410 in FIG. 4, would be available.

Figure 7:
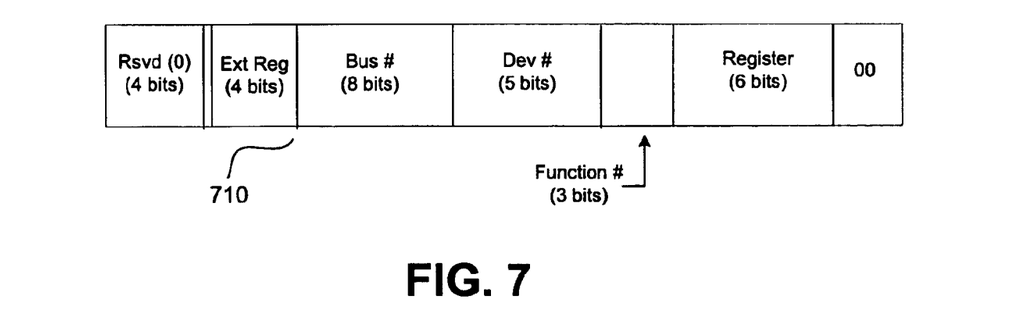
FIG. 7 is a block diagram of a format for addressing configuration registers.

Further, using some of the reserved bits in the I/O register format should allow more devices to be addressed and more data to be addressed on each device. FIG. 7 shows format 710 of an implementation that uses the right-most four reserved bits for additional "register" bits, thus providing twelve register bits and allowing up to four kilobytes of configuration data to be addressed on each device. In such an implementation, standard PCI devices would ignore the reserved bits and only use 256 bytes of the available configuration data space. However, devices may be designed to use the additional reserved bits when communicating with a system that uses them, and to default to standard PCI specifications when use of the additional bits is not supported by the system. Other implementations may use some of the reserved bits for other purposes, such as to address additional devices.

Using Configuration Space for Configuration Data

Figure 8:
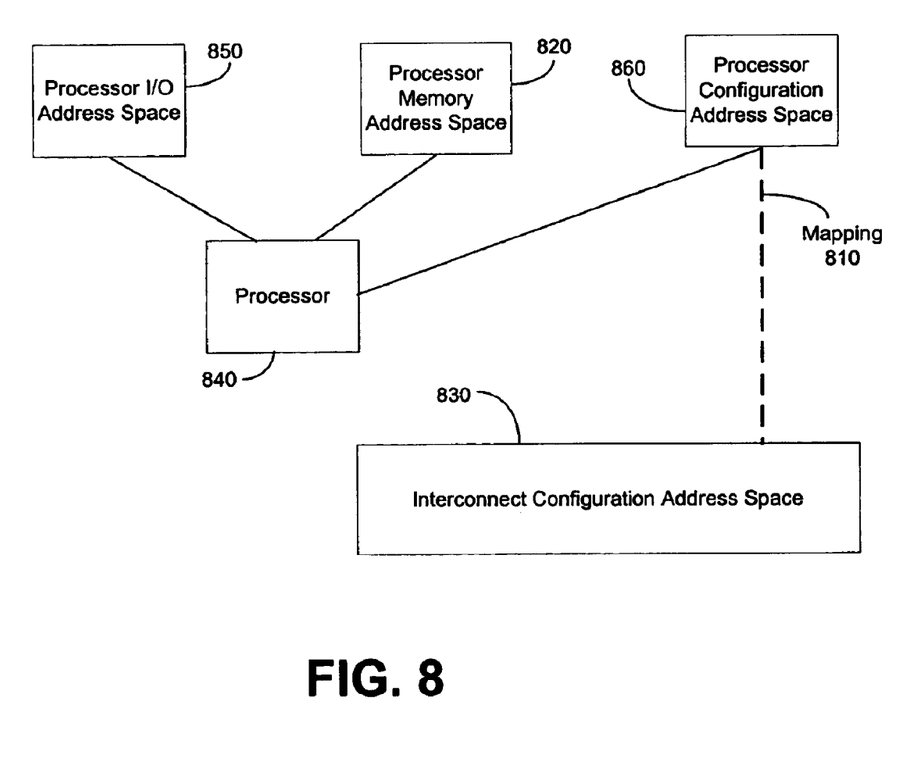
FIG. 8 is a block diagram showing a mapping between address spaces.

Another implementation creates a third processor-address-space, in addition to the standard I/O space and the memory space. All these spaces are collectively referenced by the term "processor addressable space." The third processor-address-space will be referred to as the processor's configuration address space, or simply as the processor's configuration space. This implementation maps the interconnect's device configuration space to the processor's configuration space. This is depicted in FIG. 8 by mapping 810 between processor configuration address space 860 and interconnect configuration address space 830. Processor 840, processor memory address space 820, and processor I/O address space 850, in FIG. 8, are analogous to processor 540, processor memory address space 520, and processor I/O address space 550, in FIG. 5. Assuming that the components in FIG. 3 were designed for the current implementation, the processor 312 would access the configuration data of the attached devices 330–390 using the processor's configuration space.

New processor instructions, referred to generically as configuration instructions, are used for this implementation. These instructions are similar to memory instructions in that they are generally atomic, one-step operations. Three sample instructions are described below for read, write, and mask operations:

Read Configuration: RDCFG <DWORD>, <Register>

This atomic instruction reads the specified register, pointed to by <Register>, into DWORD register or memory location.

Write Configuration: WRCFG <Register>, <DWORD>

This atomic instruction writes the DWORD register or memory location into the specified register.

Read-Modify-Write Configuration with AND/OR Mask:
  MODCFG <Register>, <AND Mask>, <OR Mask>

This atomic instruction sets or resets bits in the specified register depending upon the specified AND and OR masks.

A block read configuration instruction, thought not necessarily atomic, is provided for the convenience it offers in performing read operations:

Block Read Configuration:
  BLKRDCFG <PTR>, <Register>, <Length>

This instruction reads the <length> DWORDs from the specified register into the memory space pointed to by <PTR>. Block reads might not be atomic.

As with the memory space implementation discussed earlier, this implementation requires some changes to the interconnect chip set. In particular, this implementation requires that the interconnect chip set respond to processor configuration space access cycles on the processor's bus if these access cycles are directed to addresses mapped to device configuration data.

Figure 9:
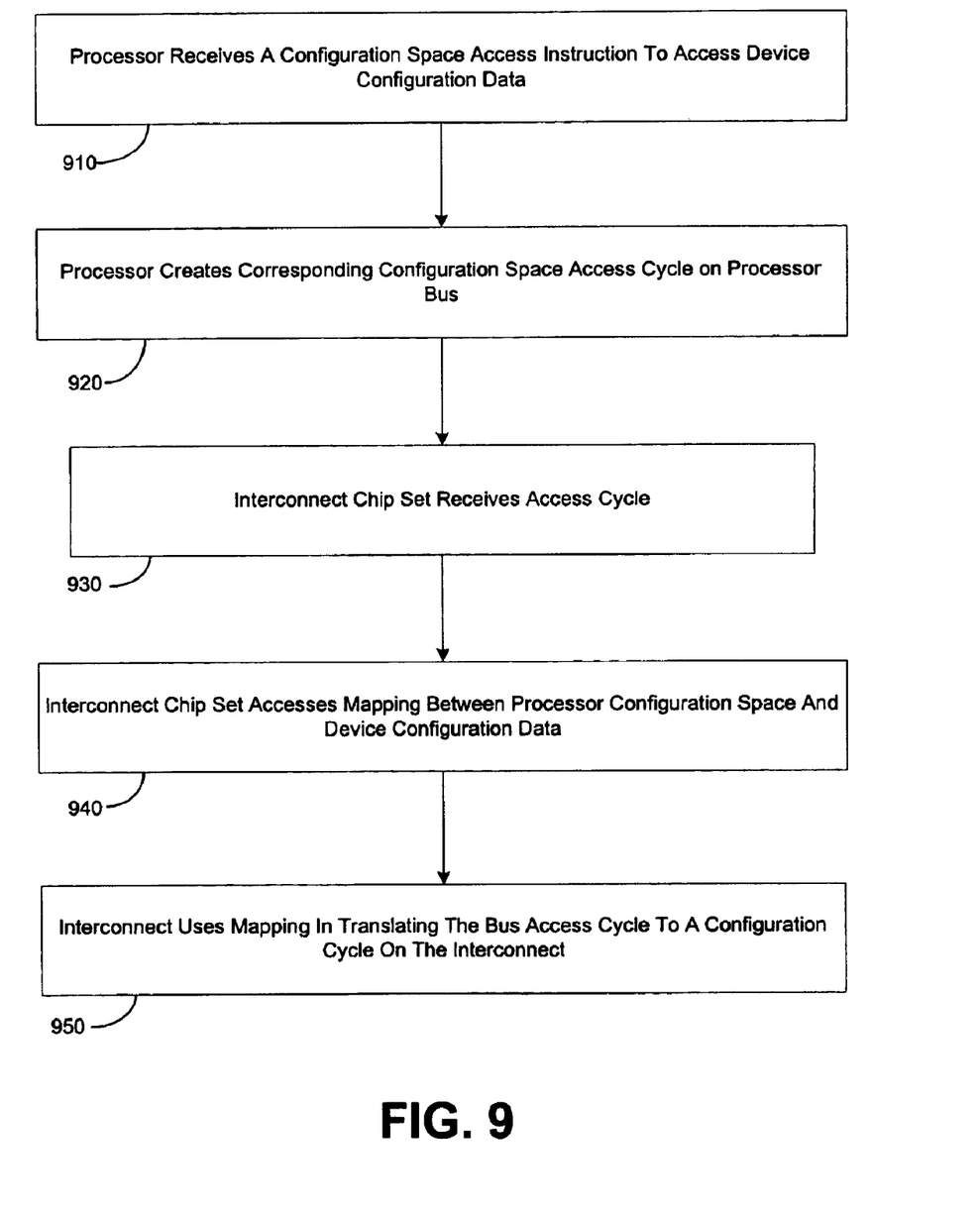
FIG. 9 is a flow chart of a process for accessing device configuration data.

As shown in FIG. 9, the processor first receives a configuration space access instruction to access device configuration data (910). The processor then creates a corresponding configuration space access cycle on the processor bus (920). Both the instruction and the access cycle can be referred to as requests to access device configuration data.

The interconnect chip set receives this access cycle (930). The interconnect chip set then accesses a mapping between the processor's configuration address space and the device's configuration data (940). The mapping, the purpose of accessing it, and the manner of accessing it are similar to the earlier discussion of the corresponding step in the memory space implementation. Finally, the interconnect chip set uses the mapping information to translate the configuration space bus access cycle to a configuration cycle on the interconnect, with the goal of accessing the configuration data of the device (950).

In all other material respects, this implementation is similar to the memory space implementation. Accordingly, it should retain all of the benefits and advantages of that implementation, including potential backward compatibility with PCI devices.

Assignment of Devices and Security

Figure 10:
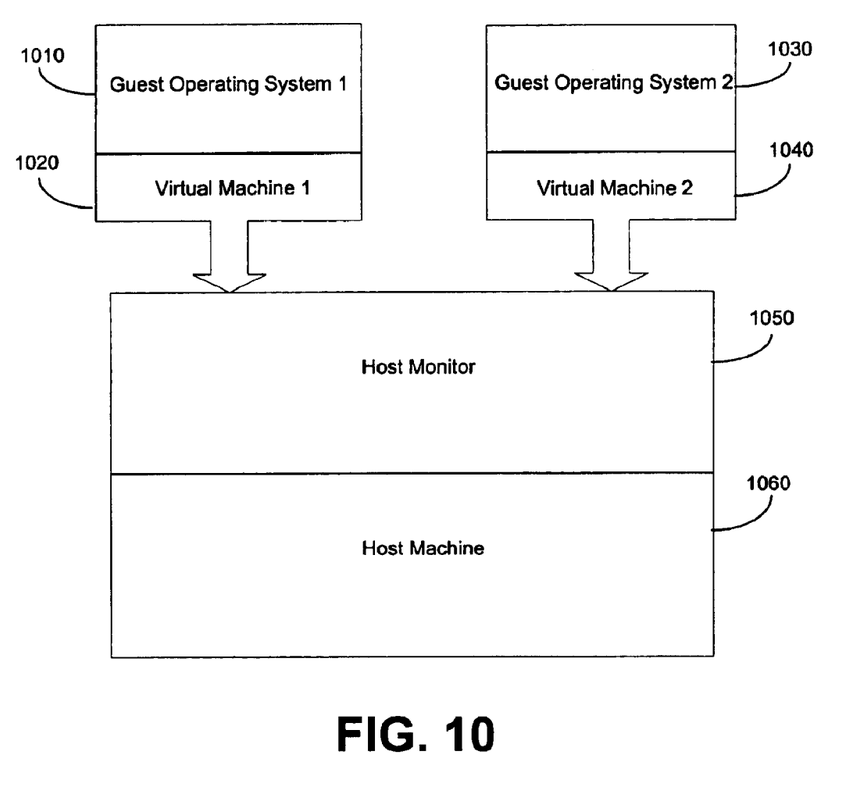
FIG. 10 is a logical-level block diagram of an implementation with multiple virtual machines.

FIG. 10 shows a host machine 1060 running a host monitor 1050. On top of the host monitor 1050, two virtual machines 1020, 1040 are running, with each of the virtual machines 1020, 1040 being allowed to run a different operating system 1010, 1030. Each of the two principal implementations discussed earlier can be modified to assign particular devices to a particular virtual machine ("VM"). The actual assignment may include maintaining a table or other data construct that correlates the various devices to a VM. Although not necessary in all implementations, one implementation also enforces the assignment. The assignment may be enforced, for example, by inhibiting a VM, or other user, from detecting, accessing, configuring, or using a device not assigned to that VM or other user. Inhibiting a VM from performing an operation need not result in complete or even partial prevention.

Figure 11:
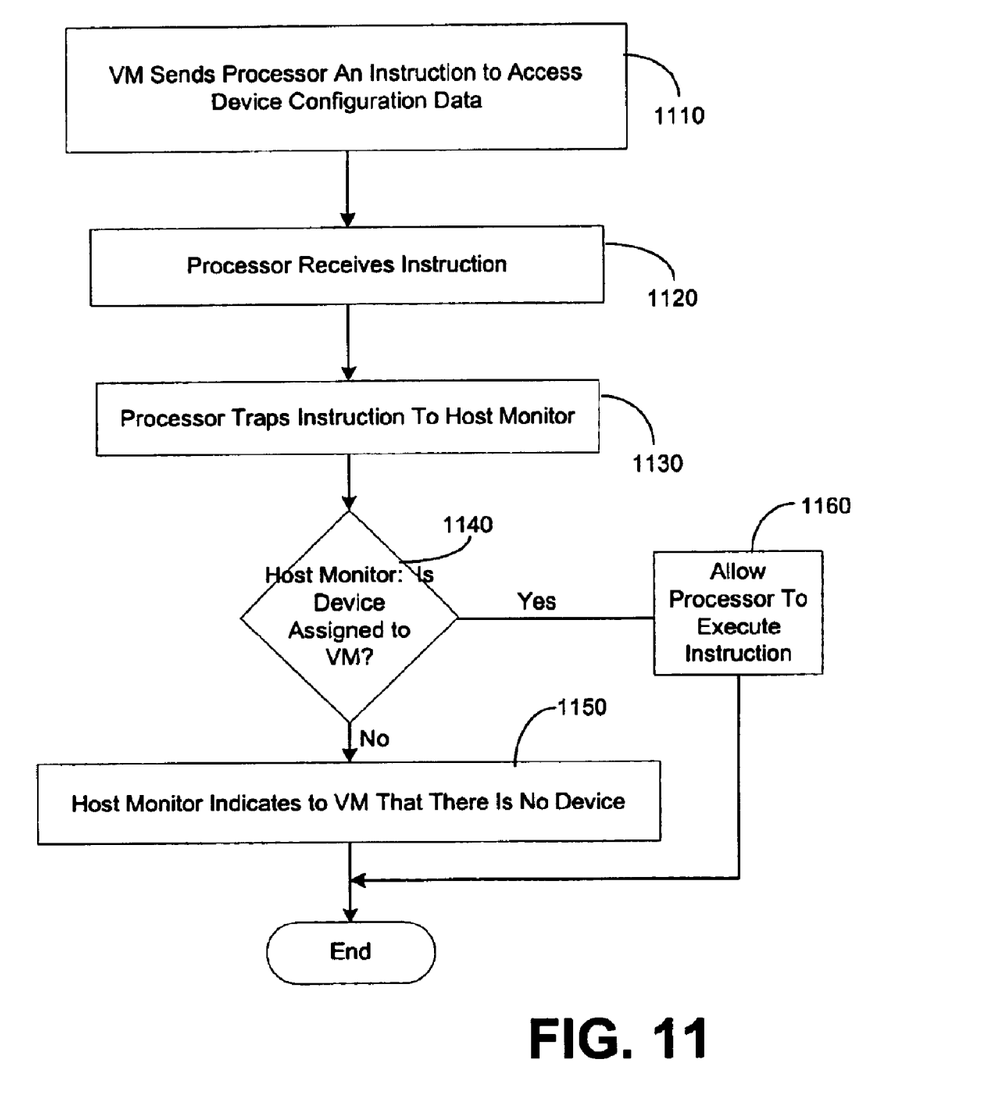
FIG. 11 is a flow chart of a process for enforcing a device assignment to a particular virtual machine.

FIG. 11 depicts a process for enforcing a particular device assignment by inhibiting detection. By implementing the process of FIG. 11, each VM only sees a portion of the resources attached to the system. Hence, a system implementing this process is called a device virtualization system. Each VM of FIG. 11 also has access to every resource that it can detect. As is common with plug-and-play interconnects, such as PCI, a VM may try to detect a device by issuing an instruction to access the configuration space of a device (1110). The processor receives this instruction (1120) and performs a trap to the host monitor (1130). If the instruction was an atomic instruction, the processor's trap can be referred to as a single-step trap. The processor only traps those instructions that attempt to access device configuration data. In the processor memory-space implementation described above, the processor traps a memory instruction if it is for a processor memory space address that is mapped to device configuration data. In the processor configuration-space implementation described above, the processor traps a configuration instruction if it is for a processor configuration space address that is mapped to device configuration data. Because both the memory instructions and the configuration instructions are preferably atomic operations, trapping is a feasible task. In a PCI system, however, trapping I/O instructions is often computationally infeasible. In the processor configuration-space implementation, block reads should be trappable based on the beginning address of the block.

Continuing with FIG. 11, the host monitor then determines if the VM that issued the instruction is assigned to the device whose configuration data the VM is trying to access (1140). The described implementations incorporate certain features to assist in making this determination.

In the implementation using memory instructions, the size of the space allocated for each device's configuration data often is either the same as, or a multiple of, the processor's page size. The processor's page size is the basic unit for managing memory. Setting the device configuration-data-space size equal to the processor page size simplifies virtualizing devices, enforcing assignments, and providing security. Problems can arise if the size of the configuration block allocated for each device does not equal the processor page size or a multiple thereof. Two such problems are now described.

The first problem concerns the handling of trapped instructions. With typical processors, the host monitor is not given the particular address that the instruction attempted to access, but only an indication of the four kilobyte block in which that address is located. For this reason, unless the processor is redesigned, it is important that the configuration data for only one device be mapped to any given four kilobyte block. If the configuration data for two devices were allocated, even in part, to the same four kilobyte block, then more than one VM might have access to that block and, hence, access to the configuration data of both devices. If both devices were not assigned to the same VM, then security of the devices could not be strictly enforced. In alternate implementations, the processor could be designed to provide the host monitor a better indication of the address that the trapped instruction was attempting to access. For example, a two kilobyte page could be used, or the processor could even provide the exact address that the trapped instruction was attempting to access.

The second problem is related and also pertains particularly to the memory space implementation. One implementation, as described earlier, uses four kilobytes as the size for each device's configuration data space. Memory instructions and memory mapping are based on the processor's page size. Assuming for the moment that the host monitor knew exactly what address a trapped instruction was attempting to access, the host monitor could determine more precisely how to handle the trapped instruction, that is, whether to allow it to execute normally. However, if the memory instructions of a standard processor were being used to access the device configuration data, as in the memory space implementation, security might still be compromised. This is because the processor retrieves pages of memory at a time. If the configuration data for two devices were allocated to the same page of memory, even in part, then a VM might detect a device that was not assigned to it. In such a case, the last page of memory retrieved for a particular device's configuration data would also contain configuration data for another device that might not be assigned to the VM.

Figure 12:
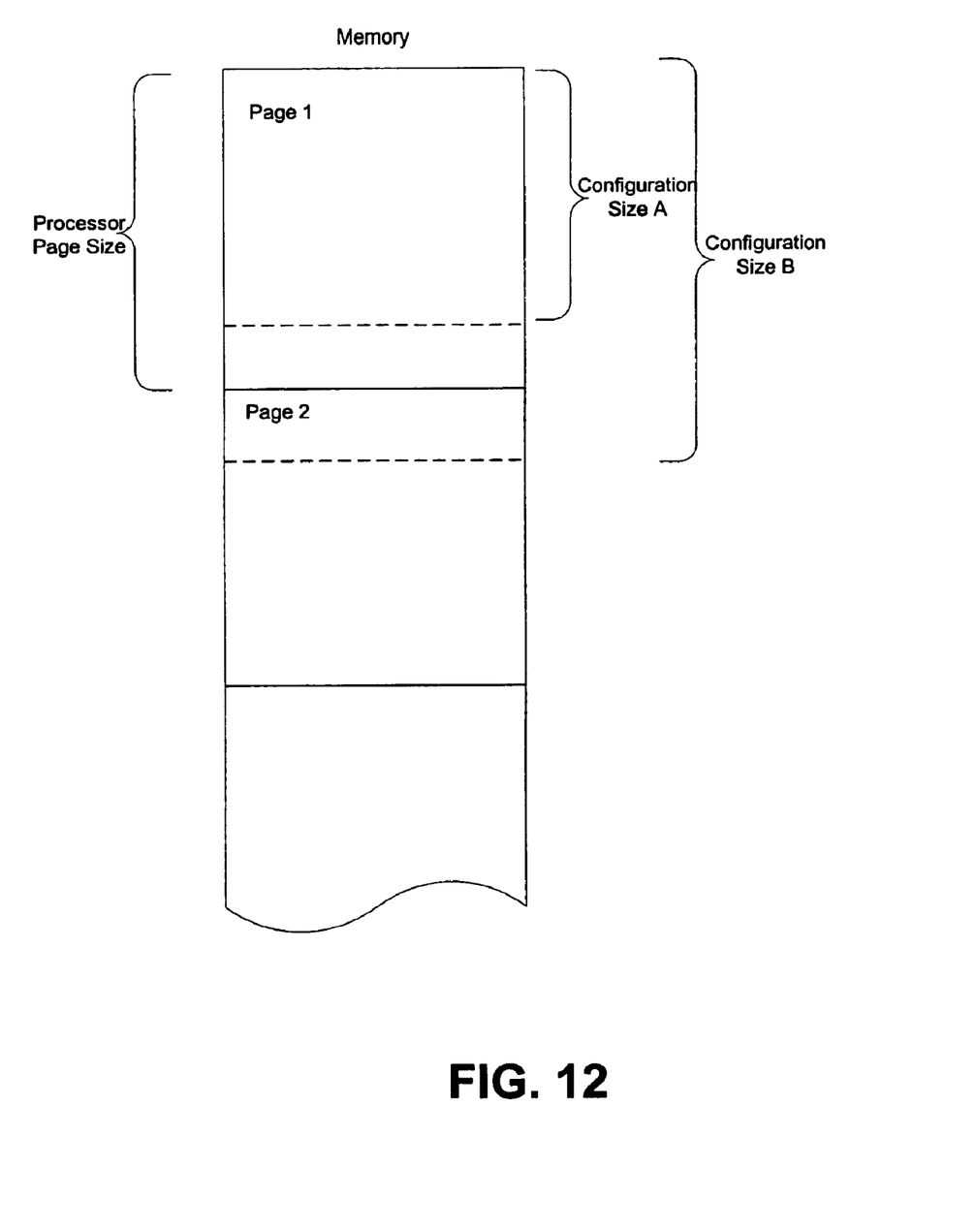
FIG. 12 is a logical view of memory illustrating different configuration data sizes.

This potential problem is depicted in FIG. 12, which shows two different sizes for the space allocated for a device's configuration data. With configuration size A, the processor must pull up only page 1. However, page 1 may also contain the beginning of another device's configuration data. With configuration size B, the processor must pull up pages 1 and 2. However, page 2 may also contain the beginning of another device's configuration data. If a VM gets access to the configuration data of a device that is not assigned to that VM, the VM may, as a result, be able to detect, configure, and/or use that device.

The concern over the size of the space allocated for device configuration data is not as critical in the processor configuration-space implementation. In that implementation, new instructions and a new processor address space are created and those instructions and their implementation in the new address space can be tailored as required. The new processor could retrieve smaller pages of data or retrieve only the bytes that were requested, for example. Thus, the configuration-space implementation can be designed to be free of many of the constraints of the memory-space implementation.

Returning to FIG. 11, if the device is allocated to the VM issuing the trapped instruction, then the instruction is allowed (1160). If not, then the host monitor "completes" the instruction itself by replying to the VM with data indicating that there is no device at that location (1150). In the latter situation, however, the VM assumes that the instruction executed without being trapped. In PCI systems, for example, a VM detects a device by reading some of its configuration data, such as vendor ID and device ID. If the returned data is all 1s, that indicates that there is no device at that address. Accordingly, in a PCI or PCI-backward-compatible system, one implementation would simply return all 1s to the VM if the VM was not assigned to a particular device.

Other schemes for inhibiting detection, configuration, or use are possible. In some implementations, the host monitor maintains an assignment table that the individual VMs access. In such a way, each VM looks up its device assignments. Such a system may be self-enforcing or enforced through traps, for example. In another implementation, a VM may even be allowed to see what devices are attached to the system but are not assigned to it. As long as a VM does not attempt to use a device that is not assigned to it, it would not be necessary for the processor to trap any instructions to the host monitor. Such an implementation would provide robustness, but this level of enforcement and inhibiting would fall short of complete security.

Implementations that provide and enforce assignment of devices to particular VMs enable a wide variety of applications and benefits. Of particular importance is the ability to provide increased security to particular devices that need it, without inhibiting the other devices and the VMs using them. For example, referring back to FIG. 10, a network card for accessing the Internet could be assigned to the first VM 1020, and operating system 1010 would employ strict security measures to protect the host machine 1060 from attack by a virus, worm, or other threat from the Internet. At the same time, for example, a variety of other devices such as a keyboard, a monitor, and a printer could be assigned to the second VM 1040, and operating system 1030 could operate in a much less secure mode which would provide greater convenience to the user.

In other applications, a primary benefit is simply the ability to prevent a VM from detecting a particular device. For example, a home computer system may be set up to provide a separate VM for use by the children and it may be desirable if an attached credit card reader was not assigned to that VM.

Figure 13:
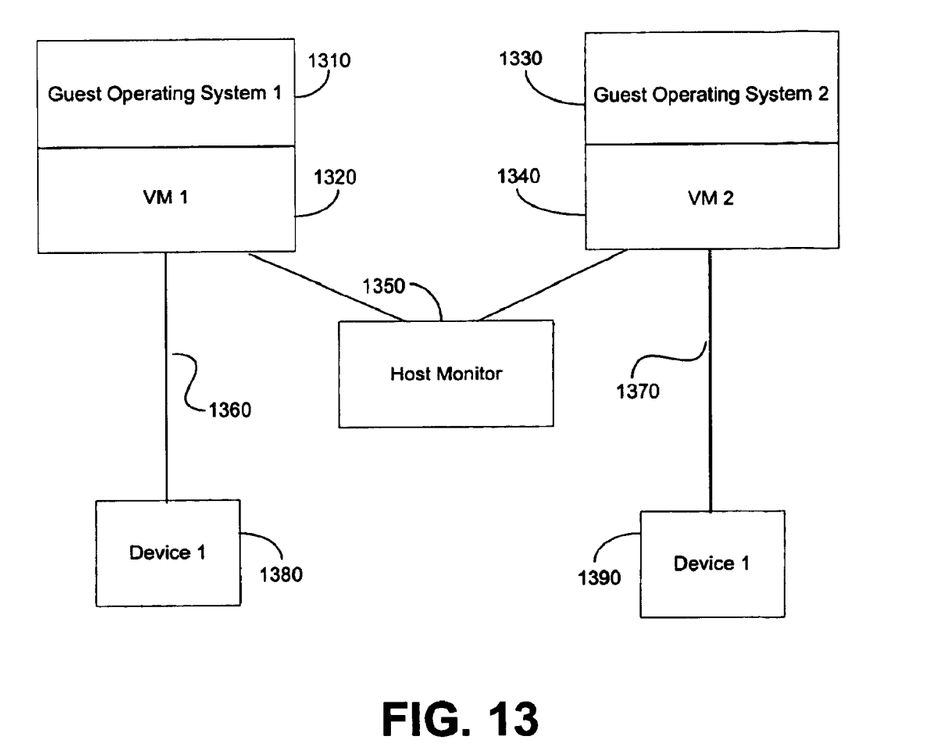
FIG. 13 is a logical-level block diagram of device assignments.

FIG. 13 depicts a high level logical view of a device assignment in a particular implementation. A first device 1380 has been assigned to a first VM 1320, and a second device 1390 has been assigned to a second VM 1340. These device assignments are exclusive as suggested by connections 1360, 1370. For the purpose of using the devices, as opposed to detecting or configuring them, connection 1360 connects the first VM 1320 and the first device 1380, and connection 1370 connects the second VM 1340 and the second device 1390. These connections 1360, 1370 are shown to be unimpeded by the host monitor 1350 because instructions to use these devices 1380, 1390, as opposed to detecting or configuring them, will not be trapped to the host monitor 1350 by the processor.

Additional Variations

A number of implementations have been described. Nevertheless, it will be understood that various modifications may be made without departing from the spirit and scope of the claims. For example, the features incorporated in the implementations can be applied to a variety of interconnects to provide device assignment and security, or improved performance and/or robustness. These features may be embodied in a process, a device, a combination of devices employing a process, or in a computer readable medium embodying instructions for such a process. The medium may be, without limitation, a floppy disk, a hard disk, RAM, ROM, firmware, or even electromagnetic waves encoding or transmitting instructions. Accordingly, other implementations are within the scope of the following claims.

What is claimed is:

1. A method of accessing a configuration data space for a device, the device being connected to a processor through an interconnect, the method comprising:

receiving a request from the processor to access the processor's addressable space, the request being generated in response to an instruction intended to access the device's configuration data space;

accessing a map between the device's configuration data space and the processor's addressable space, the map having previously mapped the device's configuration data space to one or more pages of the processor's addressable space, such that only the device's configuration data space is mapped to the one or more pages, the pages having a page size that is a unit for managing at least a portion of the addressable space in the processor; and translating, using the map, the request from the processor into a configuration cycle on the interconnect to access the device's configuration data space, wherein the one or more pages of processor addressable space are in a third address space of the processor, the processor having at least three address spaces, including a memory address space, an input-output address space, and the third address space, and the instruction comprises a third-address-space instruction.

2. The method of claim 1 further comprising mapping the device's configuration data space to one or more pages of the processor's addressable space.

3. The method of claim 1 wherein the instruction comprises an atomic instruction, the atomic instruction being an instruction that is indivisible and must be carried to completion or not performed at all.

4. The method of claim 1 wherein the configuration data space of the device and one page of memory in the processor's addressable space both have the same size.

5. The method of claim 1 wherein the configuration data space of the device is mapped to two pages of memory in the processor's addressable space.

6. The method of claim 1 wherein:

the interconnect is a PCI, the device is a PCI-compatible input-output device, and the mapping and the instruction are backward-compatible with PCI.

7. The method of claim 1 wherein the device is selected from a group consisting of a bridge, a switch, and a memory device.

8. The method of claim 1 wherein the instruction comprises an instruction selected from a group consisting of a read instruction and a write instruction.

9. The method of claim 1 wherein the instruction to access the device's configuration data space is part of an attempt to detect the device.

10. The method of claim 1 wherein the instruction to access the device's configuration data space is part of an attempt to configure the device.

11. An apparatus comprising:

a device;

an interconnect; and a controller connected to the device through the interconnect, the controller being programmed to:

receive a request from a processor to access the processor's addressable space, the request being generated in response to an instruction intended to access the device's configuration data space, access a map between the device's configuration data space and the processor's addressable space, the map having previously mapped the device's configuration data space to one or more pages of the processor's addressable space, such that only the device's configuration data space is mapped to the one or more pages, the pages having a page size that is a unit for managing at least a portion of the addressable space in the processor, and translate, using the map, the request on the processor bus into a configuration cycle on the interconnect to access the device's configuration data spaces, wherein the one or more pates of processor addressable space are in a memory address space of the processor, and the instruction comprises a memory-address-space instruction that includes an atomic instruction, the atomic instruction being an instruction that is indivisible and must be carried to completion or not performed at all.

12. A method of accessing a configuration data space for a device, the device being coupled to a processor, the method comprising:

receiving a request to access a location in a processor's addressable space wherein the location is in a portion other than an input-output-address-space portion of the processor's addressable space;

determining that the location corresponds to a device's configuration data space, the device's configuration data space mapping to one or more pages of the processors addressable space, the pages having a page size that is a unit for managing at least a portion of the processor's addressable space; and accessing the device's configuration data space.

13. The method of claim 12 wherein the request comprises an instruction and receiving the request comprises the processor receiving the instruction.

14. The method of claim 12 wherein the request is a memory space access cycle and receiving the request comprises an interconnect controller receiving the memory space access cycle.

15. The method of claim 12 wherein receiving the request comprises receiving an atomic instruction, the atomic instruction being an instruction that is indivisible and must be carried to completion or not performed at all.

16. The method of claim 12 wherein the location is in a memory-address-space portion of the processor's addressable space and receiving the request comprises receiving a request to access the location in the memory-address-space portion of the processor's addressable space.

17. The method of claim 12 wherein the location is in a third-address-space portion, distinct from the input-output-address-space portion and a memory-address-space portion of the processor's addressable space, and receiving the request comprises receiving a request to access the location in the third-address-space portion of the processor's addressable space.

18. The method of claim 12 wherein:

the device is a PCI-compatible device, and accessing the device's configuration data space comprises creating a PCI-compatible configuration cycle.

19. The method of claim 12 wherein receiving the request comprises receiving an atomic instruction, the atomic instruction being an instruction that is indivisible and must be carried to completion or not performed at all.

20. The method of claim 19 wherein the location is in a memory-address-space portion of the processor's addressable space and receiving the request comprises receiving a request to access the location in the memory-address-space portion of the processor's addressable space.

21. The method of claim 19 wherein the location is in a third-address-space portion, distinct from the input-output-address-space portion and a memory-address-space portion of the processor's addressable space, and receiving the request comprises receiving a request to access the location in the third-address-space portion of the processor's addressable space.

22. A method of accessing a configuration data space for a device, the device being connected to a processor through an interconnect, the method comprising:

receiving a request from the processor to access the processor's addressable space, the request being generated in response to an instruction intended to access the device's configuration data space;

accessing a map between the device's configuration data space and the processor's addressable space, the map having previously mapped the device's configuration data space to one or more pages of the processor's addressable space, such that only the device's configuration data space is mapped to the one or more pages, the pages having a page size that is a unit for managing at least a portion of the addressable space in the processor; and translating, using the map, the request from the processor into a configuration cycle on the interconnect to access the device's configuration data space, wherein the instruction is an atomic instruction, the atomic instruction being an instruction that is indivisible and must be carried to completion or not performed at all.

23. A method of accessing a configuration data space for a device, the device being coupled to a processor, the method comprising:

receiving a request to access a location in a processor's addressable space;

determining that the location corresponds to a device's configuration data space, the device's configuration data space mapping to one or more pages of the processors addressable space, the pages having a page size that is a unit for managing at least a portion of the processor's addressable space; and accessing the device's configuration data space, wherein the request is an atomic instruction, the atomic instruction being an instruction that is indivisible and must be carried to completion or not performed at all.

24. A method of accessing a configuration data space for a device, the device being coupled to a processor, the method comprising:

receiving a request to access a location in a processor's addressable space;

determining that the location corresponds to a device's configuration data space, the device's configuration data space mapping to one or more pages of the processors addressable space, the pages having a page size that is a unit for managing at least a portion of the processor's addressable space; and accessing the device's configuration data space, wherein the location is in a third-address-space portion, distinct from an input-output-address-space portion and a memory-address-space portion of the processor's addressable space, and receiving the request comprises receiving a request to access the location in the third-addressable-space portion of the processor's addressable space.

* * * * *